(12) United States Patent
Yu-Chih

(10) Patent No.: US 6,262,714 B1
(45) Date of Patent: Jul. 17, 2001

(54) POINTING DEVICE WITH A DETACHABLE ROLLER BALL MODULE

(75) Inventor: Cheng Yu-Chih, Taipei (TW)

(73) Assignee: Primax Electroniocs Lts., Taipei (TW)

( * ) Notice: Subject to any disclaimer, the term of this patent is extended or adjusted under 35 U.S.C. 154(b) by 0 days.

(21) Appl. No.: 09/231,703

(22) Filed: Jan. 13, 1999

(30) Foreign Application Priority Data

Dec. 18, 1998 (TW) .................................................. 87121240

(51) Int. Cl.⁷ .................................................. G09G 5/08
(52) U.S. Cl. ............................................ 345/163; 345/164
(58) Field of Search .................................. 345/163, 164, 345/165, 166, 167

(56) References Cited

U.S. PATENT DOCUMENTS 5,345,253 * 9/1994 Chang .................................... 345/167
5,448,023 * 9/1995 Tooi ...................................... 345/167
5,828,364 * 10/1998 Siddiqui ................................ 345/163

* cited by examiner

Primary Examiner—Richard Hjerpe
Assistant Examiner—Alexander Eisen
(74) Attorney, Agent, or Firm—Winston Hsu

(57) ABSTRACT

The present invention provides a pointing device comprising a housing, a roller ball module and a circuit board. The roller ball module has a mounting frame detachably installed in the housing, a roller ball rotatably fixed in the mounting frame and two light gratings rotatably installed in the mounting frame for contacting the roller ball to detect rotations of the roller ball in two different directions. The circuit board installed in the housing has two optic sensors for sensing rotations of the two light gratings and generating corresponding two-dimensional pointing signals. The roller ball module can be attached to or detached from the housing directly by hand.

6 Claims, 4 Drawing Sheets

POINTING DEVICE WITH A DETACHABLE ROLLER BALL MODULE

BACKGROUND OF THE INVENTION

1. Field of the Invention

The present invention relates to a pointing device, and more particularly, to a pointing device with a detachable roller ball module.

2. Description of the Prior Art

Pointing devices are indispensable PC peripherals. A common prior art pointing device comprises a roller ball, two light gratings, and two sensors within its housing. The light gratings sense rotations of the roller ball in two different directions and the sensors sense rotations of the two light gratings to generate two-dimensional pointing signals. Since the pointing device already can be easily controlled and operated, most of the current focus is on improving its internal structure and modifying the shape of its housing.

Please refer to FIG. 1. FIG. 1 is a perspective view of an internal structure of a prior art pointing device 10. The pointing device 10 comprises a housing 12, and a roller ball module 14 integrally installed in the housing for installing a roller ball (not shown). Because the housing 12 and the roller ball module 14 are integrally built, the roller ball module 14 can not be detached for regular cleaning and maintenance. Moreover, each time a new pointing device is developed, a new mold has to be developed for making the new pointing device. Since a roller ball module has a very complex structure, resigning and making a new mold for the new roller ball module is very costly.

SUMMARY OF THE INVENTION

It is therefore a primary objective of the present invention to provide a pointing device with a detachable roller ball module to solve the above mentioned problem.

In a preferred embodiment, the present invention provides a pointing device comprising:

- a housing;
- a roller ball module having:
  - a mounting frame detachably installed in the housing;
  - a roller ball rotatably fixed in the mounting frame; and
  - two light gratings rotatably installed in the mounting frame for contacting the roller ball to detect rotations of the roller ball in two different directions; and
- a circuit board installed in the housing having two optic sensors for sensing rotations of the two light gratings and generating corresponding two-dimensional pointing signals;
- wherein the roller ball module can be attached to or detached from the housing directly by hand.

It is an advantage of the present invention that the roller ball module can be detached from the housing for regular cleaning and maintenance, and that a mold for making the roller ball module can be reused for making a new roller ball module when a new pointing device is developed.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
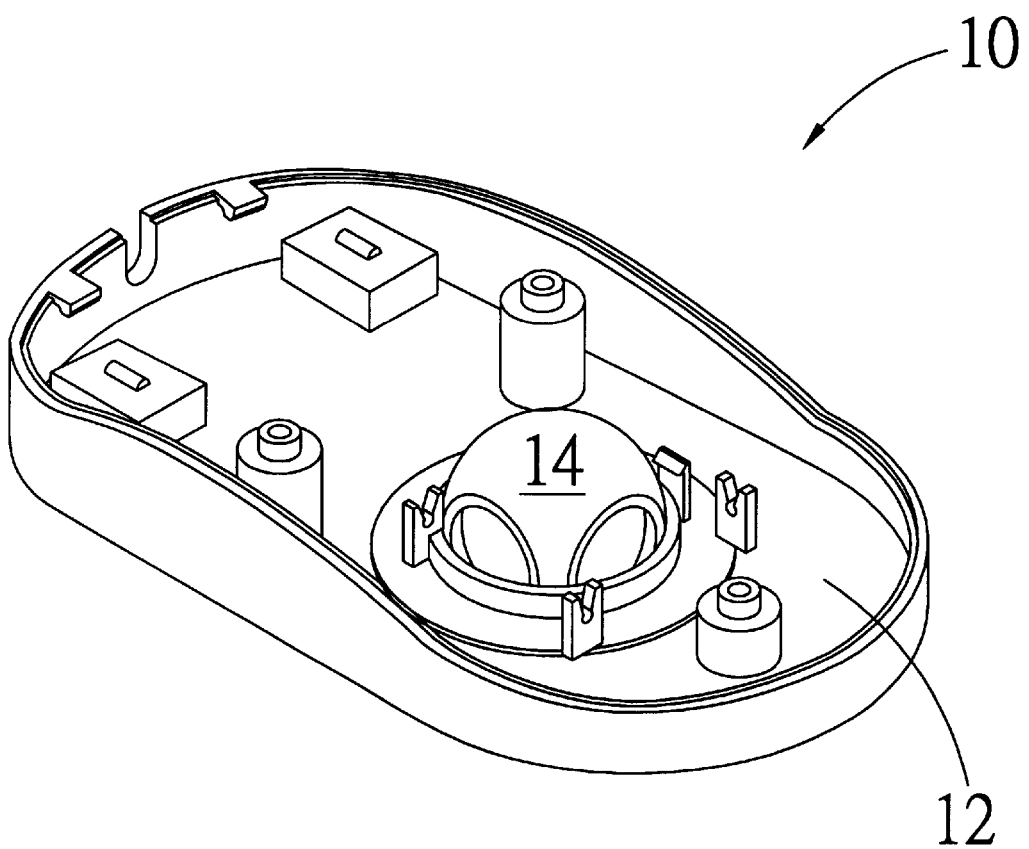
FIG. 1 is a perspective view of an internal structure of a prior art pointing device.
Figure 2:
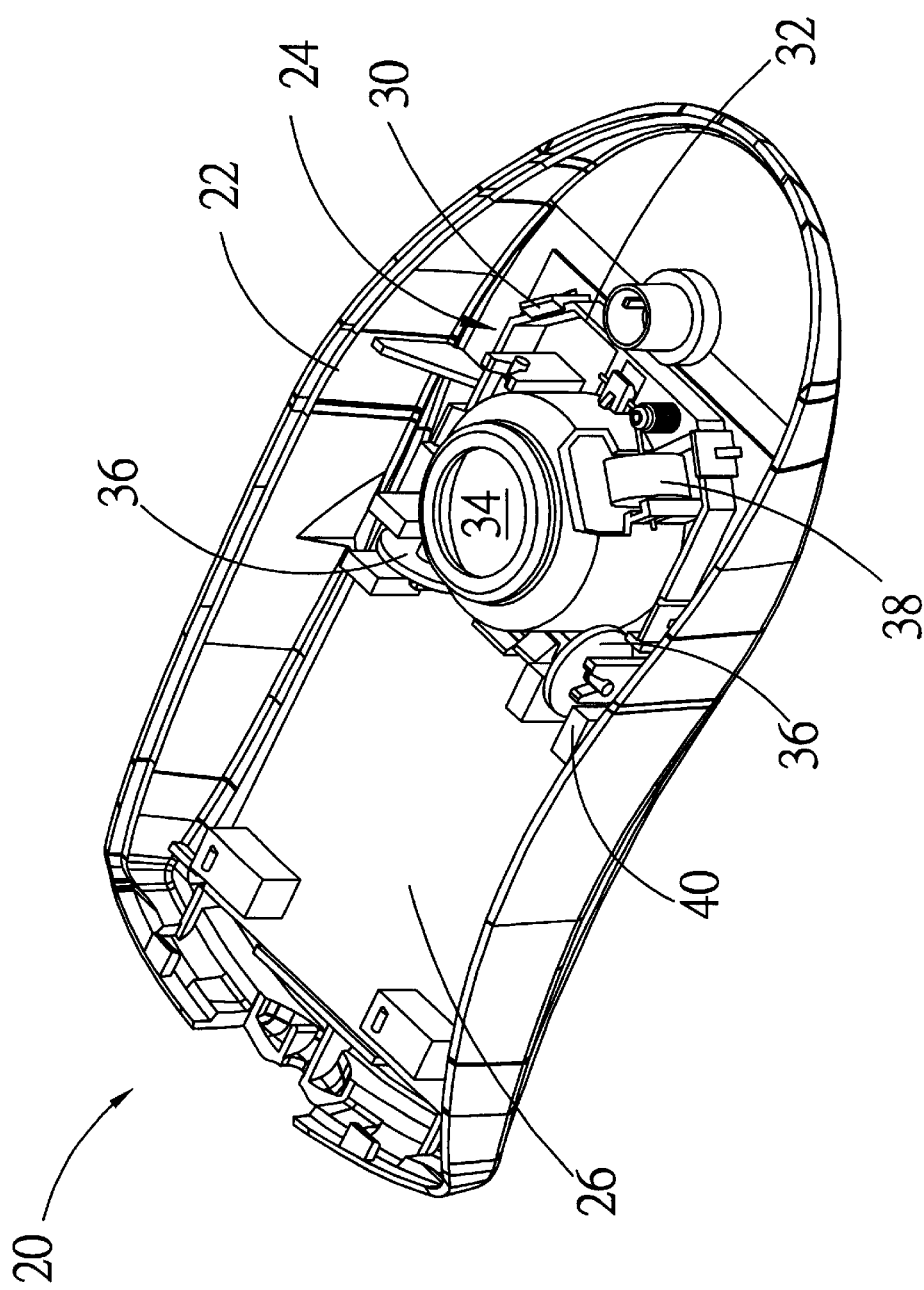
FIG. 2 is a perspective view of a pointing device according to the present invention.
Figure 3:
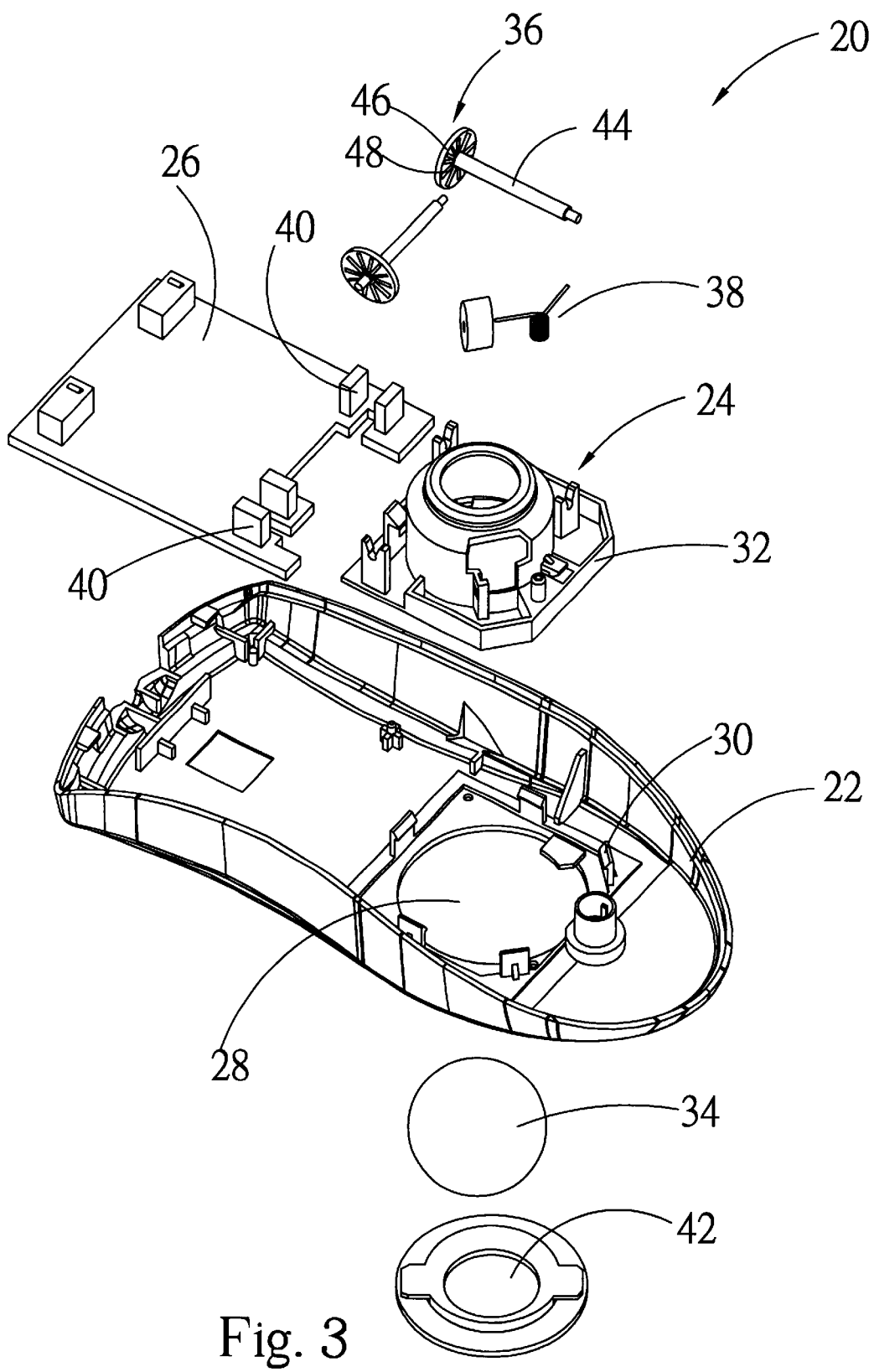
FIG. 3 is a component diagram of the pointing device shown in FIG. 2.

Please refer to FIG. 2 and FIG. 3. FIG. 2 is a perspective view of a pointing device 20 according to the present invention. FIG. 3 is a component diagram of the pointing device 20 shown in FIG. 2. The pointing device 20 comprises a housing 22, a roller ball module 24 and a circuit board 26. The roller ball module 24 has a mounting frame 32 detachably installed inside the bottom opening 28 of the housing 22, a roller ball 34 rotatably fixed in the mounting frame 32, two light gratings 36 rotatably installed in the mounting frame 32 for detecting rotations of the roller ball 34 in two different directions, and an elastic means 38 installed in the mounting frame 32 for pushing the roller ball 34 against the two light gratings 36 so that when the roller ball 34 is rotated, the two light gratings 36 will be rotated at the same time.

The housing 22 comprises a bottom opening 28 and a hooking device 30 installed around the bottom opening 28 of the housing 22 for detachably fixing the mounting frame 32 inside the housing 22. The mounting frame 32 has a circular hole 42 on its bottom end and when the pointing device is placed on a flat surface, a portion of the roller ball extends downward through the circular hole 42 to contact the flat surface so that when the pointing device 20 is moved on the surface, the roller ball 34 will be rotated at the same time.

The circuit board 26 is installed in the housing 22 and has two optic sensors 40 for sensing rotations of the two light gratings 36 and generating corresponding two-dimensional pointing signals. Each of the two light gratings 36 comprises a shaft 44 rotatably installed in the mounting frame 32 for contacting the roller ball 34 and a circular panel 46 with its center fixed to the shaft 44, and the circular panel 46 comprises a plurality of holes 48 installed around the periphery of the circular panel 46 that interacts with one of the light sensors 40. When the roller ball 34 is rotated, the shaft 44 and the circular panel 46 of each light grating 36 will be rotated at the same time and the two sensors 40 will sense the rotations of the two circular panels 46 and generate the two-dimensional pointing signals.

The roller ball module 24 can be attached to or detached from the housing 22 directly by hand. When attaching the roller ball module 24 to the housing 22, the roller ball module 24 is placed at the bottom opening 28 of the housing 22. The hooking device 30 around the bottom opening 28 of the housing 22 is then detachably fixed to the mounting frame 32 inside the housing 22.

Figure 4:
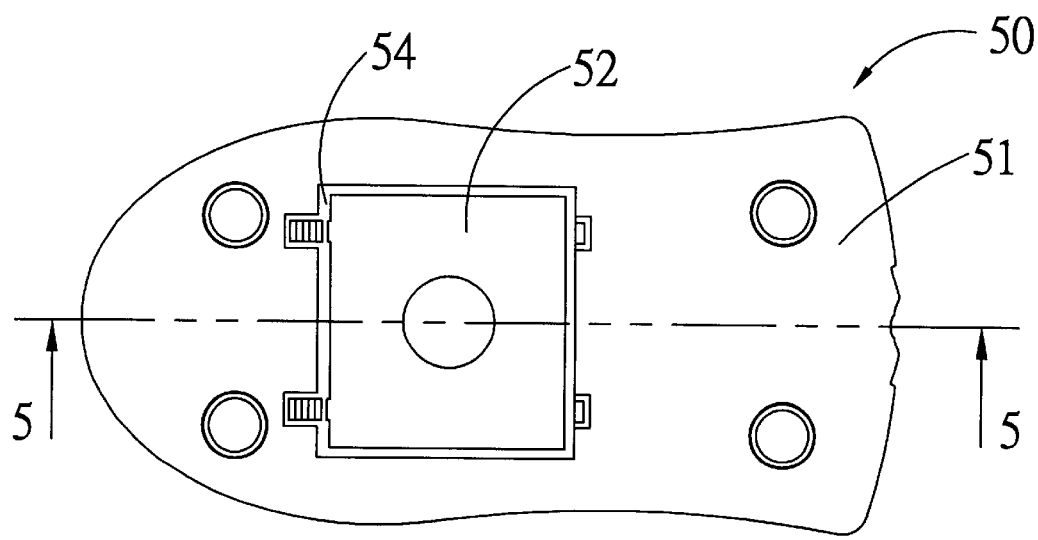
FIG. 4 is a bottom view of another pointing device according to the present invention.
Figure 5:
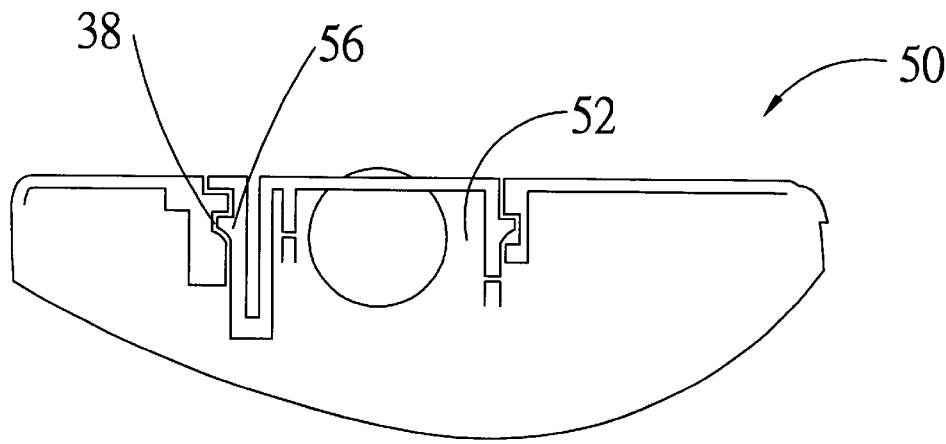
FIG. 5 is a sectional view along line 5—5 of the pointing device in FIG. 4.
Figure 6:
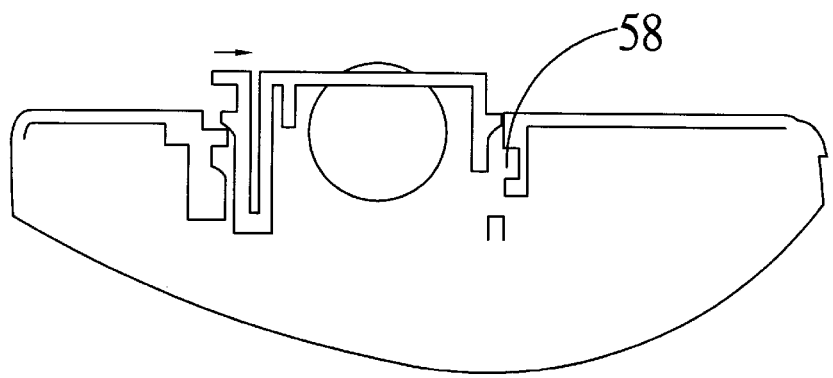
FIG. 6 is a schematic diagram of detaching the roller ball module from the pointing device in FIG. 5.

Please refer to FIG. 4 to FIG. 6. FIG. 4 is a bottom view of another pointing device 50 according to the present invention. FIG. 5 is a sectional view along line 5—5 of the pointing device 50 in FIG. 4. FIG. 6 is a schematic diagram of detaching the roller ball module 52 from the pointing device 50 shown in FIG. 5. The difference between the pointing device 50 and the pointing device 20 is that the roller ball module 52 of the pointing device 50 can be detached from a bottom opening of the housing 51. The roller ball module 52 comprises a hooking device 56 integrated on its mounting frame for engaging with an engaging means 58 installed around the bottom opening 54 of the housing 51 for fixing the roller ball module 52 inside the housing 51. When the roller ball module 52 is detached from the bottom opening 54 of the housing 51, two light gratings (not shown) installed in the roller ball module 52 can be easily reached for cleaning.

In contrast to the prior art pointing device 10, the roller ball module 24, 52 of the pointing device 20, 50 of the present invention can be detached or attached by hand. This makes regular cleaning and maintenance of the roller ball module 24, 52 convenient. Moreover, when a new pointing device is developed, the same mold for making the roller ball module 24, 52 can be reused for making a new roller ball module thus greatly saves redesign and production cost.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A mouse comprising:

a housing having a bottom opening on its bottom side;

a roller ball module having:

a mounting frame detachably fixed inside the bottom opening;

a roller ball rotatably fixed in the mounting frame wherein when the mouse is placed on a flat surface, part of the roller ball extends downward through the bottom opening and therefore contact the flat surface; and two light gratings rotatably installed in the mounting frame for contacting the roller ball to detect rotations of the roller ball in two different directions; and a circuit board installed in the housing having two optic sensors for sensing rotations of the two light gratings and generating corresponding two-dimensional pointing signals;

wherein the roller ball module can be attached to or detached from the housing directly by hand.

2. The mouse of claim 1 wherein the roller ball module can be detached from the bottom opening for cleaning dirt accumulated on the two light gratings.

3. The mouse of claim 1 wherein the mounting frame has a circular hole on its bottom end and when the mouse is placed on the flat surface, part of the roller ball extends downward through the circular hole to contact the flat surface so that when the mouse is moved on the surface, the roller ball will be rotated in the same time.

4. The mouse of claim 1 wherein the housing comprises a hooking device installed around the bottom opening of the housing for detachably fixing the mounting frame inside the housing.

5. The mouse of claim 1 wherein each of the two light gratings comprises a shaft rotatably installed in the mounting frame for contacting the roller ball and a circular panel with its center fixed to the shaft, and the circular panel comprises a plurality of holes installed around a periphery of the circular panel for interacting with the light sensors wherein when the roller ball is rotated, the shaft and the circular panel of each light grating will be rotated in the same time and the two sensors will sense the rotations of the two circular panels and generate the two-dimensional pointing signals.

6. The mouse of the claim 1 wherein the roller ball module further comprises an elastic means installed in the mounting frame for pushing the roller ball against the two light gratings so that when the roller ball is rotated, the two light gratings will be rotated in the same time.

* * * * *